US012450207B2

(12) United States Patent
De Freitas Cunha et al.

(10) Patent No.: US 12,450,207 B2
(45) Date of Patent: Oct. 21, 2025

(54) SYSTEMS AND METHODS FOR AUTHORIZING WORKFLOWS FROM A LARGE-SCALE DATASET USING A METADATA SCHEMA

(71) Applicant: Microsoft Technology Licensing, LLC, Redmond, WA (US)

(72) Inventors: Renato Luiz De Freitas Cunha, São Paulo (BR); Roberto De Moura Estevão Filho, Teresópolis (BR); Leonardo De Oliveira Nunes, Rio de Janeiro (BR); Anirudh Badam, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/865,945

(22) Filed: Jul. 15, 2022

(65) Prior Publication Data

US 2024/0020282 A1    Jan. 18, 2024

(51) Int. Cl.
*G06F 16/21* (2019.01)
*G06F 16/25* (2019.01)

(52) U.S. Cl.
CPC .......... *G06F 16/212* (2019.01); *G06F 16/258* (2019.01)

(58) Field of Classification Search
CPC .............................. G06F 16/212; G06F 16/258
See application file for complete search history.

(56) References Cited

U.S. PATENT DOCUMENTS

| 7,818,714 | B2 * | 10/2010 | Ryan | ........................ G06F 8/10 |
| | | | | 717/114 |
| 2012/0158453 | A1 * | 6/2012 | Chung | ............. G06Q 10/06316 |
| | | | | 705/7.26 |
| 2013/0283141 | A1 * | 10/2013 | Stevenson | ............... G06F 16/29 |
| | | | | 715/222 |
| 2015/0089415 | A1 * | 3/2015 | Lee | .................... G06Q 10/0633 |
| | | | | 715/765 |
| 2015/0286495 | A1 | 10/2015 | Lee | |

(Continued)

OTHER PUBLICATIONS

Bratt et al., Big Data, Big Metadata and Quantitative Study of Science: A Workflow Model for Big Scientometrics, 80th Annual Meeting of the Association for Information Science & Technology, Washington, DC | Oct. 27-Nov. 1, 2017, pp. 36-45. (Year: 2017).*

(Continued)

*Primary Examiner* — Cheyne D Ly
(74) *Attorney, Agent, or Firm* — NovoTechIP International PLLC (57) ABSTRACT

Systems and methods for authoring workflows for processing data from a large-scale dataset include defining a metadata schema for the large-scale dataset, and receiving user input defining a workflow as a plurality of operations to be performed on the data. Each of the operations includes input metadata formatted according to the metadata schema. The input metadata describes input data to be processed by the operation and identifying a location for the input data in the data storage system, programmed instructions for performing an atomic operation on the input data to generate output data; and output metadata formatted according to the metadata schema. The output metadata describes the output data and identifying a location for the output data in the data storage system.

14 Claims, 8 Drawing Sheets

(56) References Cited

U.S. PATENT DOCUMENTS

2020/0004604 A1* 1/2020 Lavoie .................. G06F 16/907
2021/0255759 A1* 8/2021 Farrell .................. G06F 3/0481
2022/0107926 A1* 4/2022 Ward .................... G06F 16/215

OTHER PUBLICATIONS

Marozzo et al. A Workflow Management System for Scalable Data Mining on Clouds, IEEE Transactions on Services Computing, vol. 11, No. 3, May/Jun. 2018, pp. 480-492. (Year: 2018).*
"International Search Report and Written Opinion Issued in PCT Application No. PCT/US23/024412", Mailed Date: Sep. 7, 2023, 15 Pages.
"Spatio Temporal Asset Catalogs", Retrieved From : https://web.archive.org/web/20220617084455/https://stacspec.org/en, Jun. 17, 2022, 10 Pages.
Mohr, et al., "Radiantearth Stac-Api-Spec", Retrieved From : https://web.archive.org/web/20220228045903/https://github.com/radiantearth/stac-api-spec, Feb. 28, 2022, 5 Pages.
Papadopoulos, et al., "TileDB-Inc/TileDB", Retrieved From : https://web.archive.org/web/20220121052246/https://github.com/TileDB-Inc/TileDB, Jan. 21, 2022, 4 Pages.

* cited by examiner

SYSTEMS AND METHODS FOR AUTHORIZING WORKFLOWS FROM A LARGE-SCALE DATASET USING A METADATA SCHEMA

BACKGROUND

Large-scale datasets including terabytes, petabytes, and exabytes of data are generated daily by digital devices and services. The large-scale datasets may include geospatial data, archived documents, documents, websites, media files (images, videos, audio files), data storage systems (repositories, databases, file systems), business applications, public and governmental data sources, social media activity, machine log data, and sensor data (from media devices, internet-of-things devices, appliances, farm equipment, vehicle sensors). Workflows may be implemented for processing data in a large-scale dataset for various reasons. For example, workflows may be implemented for analytics purposes to, for example, discover trends, patterns, relationships, and/or other attributes related to the data, which in turn may be used to gain insights and/or guide decisions and/or actions related to the data.

Existing systems capable of processing large-scale data, such as geospatial data, either force all data to flow directly between nodes in a computational graph, or force users to write their own data storage layers to persist data between operations in the computational graph. Other options are too rigid, only supporting a restricted list of pre-approved operators, without support for executing user-provided operators. Existing systems, such as Apache Spark®, cannot have an independent task orchestrator, as processing is inherently tied to the user data, forcing users to define how data is distributed and how code is executed. For example, Spark Resilient Distributed Dataset (RDD) partitions data in a cluster for parallel processing which requires that users know the layout of the data and how to process it. Existing systems also do not provide adequate data caching between operations and data reuse and therefore are inefficient at processing large datasets. Caching in existing systems, when implemented, needs data and operations to match exactly, otherwise there will likely be cache misses.

What is needed are systems and methods for authoring and executing workflows for processing large-scale data that simplifies the processing of defining workflows, e.g., by not requiring specialized code to be written by a user for performing operations and handling data, and that enables data persistence/caching to be implemented in an efficient and effective manner.

SUMMARY

In one general aspect, the instant disclosure presents a data processing system having a processor and a memory in communication with the processor wherein the memory stores executable instructions that, when executed by the processor, cause the data processing system to perform multiple functions. The functions include receiving a workflow definition at a backend of a workflow authoring and execution system, the workflow definition defining a plurality of operations to be performed on data from a large-scale dataset stored in a data storage system. Each of the operations includes input metadata that describes input data to be processed by the respective operations and identifies a location of the input data in the data storage system; programmed instructions for performing an atomic operation on the input data to generate output data; and output metadata that describes the output data and identifies a location of the output data in the data storage system. Each of the operations is executed by: retrieving the input data for each of the respective operations from the location of the input data identified by the input metadata as each of the respective operations is executed; storing the output data for each of the respective operations at the location of the output data identified by the output metadata as each of the respective operations is executed; providing the output metadata from each of the respective operations as the input metadata to a next operation after each of the respective operations is executed until a last operation is reached; when the last operation is executed, providing the output metadata to a front-end of the workflow authoring and execution system.

In yet another general aspect, the instant disclosure presents a method of executing a workflow for processing data from a large-scale dataset stored in a data storage system. The method includes the steps of receiving a workflow definition at a backend of a workflow authoring and execution system, the workflow definition defining a plurality of operations to be performed on the data from the large-scale dataset. Each of the operations includes: input metadata that describes input data to be processed by the respective operation and identifies a location of the input data in the data storage system; programmed instructions for performing an atomic operation on the input data to generate output data; and output metadata that describes the output data and identifies a location of the output data in the data storage system. Each of the operations is executed by: retrieving the input data for each of the respective operations from the location of the input data identified by the input metadata as each of the respective operations is executed; storing the output data for each of the respective operations at the location of the output data identified by the output metadata as each of the respective operations is executed; providing the output metadata from each of the respective operations as the input metadata to a next operation after each of the respective operations is executed until a last operation is reached; when the last operation is executed, providing the output metadata to a front-end of the workflow authoring and execution system.

In a further general aspect, the instant disclosure presents a method of authoring a workflow for processing data from a large-scale dataset stored in a data storage system. The method includes defining a metadata schema for the large-scale dataset; receiving user input at a front-end of a workflow authoring and execution system, the user input defining a workflow definition, the workflow definition including a plurality of operations to be performed. Each of the operations includes input metadata formatted according to the metadata schema, the input metadata describing input data to be processed by the operation and identifying a location for the input data in the data storage system; programmed instructions for performing an atomic operation on the input data to generate output data; and output metadata formatted according to the metadata schema, the output metadata describing the output data and identifying a location for the output data in the data storage system; receiving user input defining input parameters for the operations; validating a configuration of the workflow definition and the input parameters; and sending the workflow definition to a backend of the workflow authoring and execution system in response to the validation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

As noted above, existing large-scale data processing systems for processing large-scale data, such as geospatial data, either force all data to flow directly between nodes in a computational graph, or force users to write their own data storage layers to persist data between operations in the computational graph. Existing systems typically do not have an independent task orchestrator as processing is inherently tied to the user data, forcing users to define how data is distributed and how code is executed, and for systems that do have an orchestrator, they tend to assume that all data will flow between the nodes in a computational graph. Existing systems also do not provide adequate data caching between operations and data reuse and therefore are inefficient at processing large datasets. Caching in existing systems, when implemented, may need data and operations to match exactly, otherwise there will likely be cache misses.

To address these technical problems and more, in an example, this description provides technical solutions that enable workflows for processing large-scale datasets to be authored using predefined operations without requiring a user to write specialized code for data handling and implementing functionality. To facilitate the authoring of workflows using predefined operations, the system utilizes a predefined metadata schema for the dataset that specifies the data types and attributes implemented in the dataset, the vocabulary/terminology utilized to refer to the data types and attributes, data structures for communicating information pertaining to the dataset, and the like. The predefined metadata schema enables input and output metadata formats to be defined for each operation which enables the code for implementing the functionality of the operations to be prewritten for the system. By predefining the inputs and outputs of the operations, the data handling functionality of the system, such as persisting/caching data between operations, downloading data, and uploading data, may be handled by the system without requiring the user to write specialized code for data handling. The input metadata and the output metadata may also include metadata for defining one or more locations in the data storage system where the data is located or stored. This enables workflows to be processed by passing the output metadata from one operation to be used as the input metadata for the next operation. The data for the next operation is left in the data storage system thereby efficiently and effectively persisting/caching the data between operations.

Figure 1:
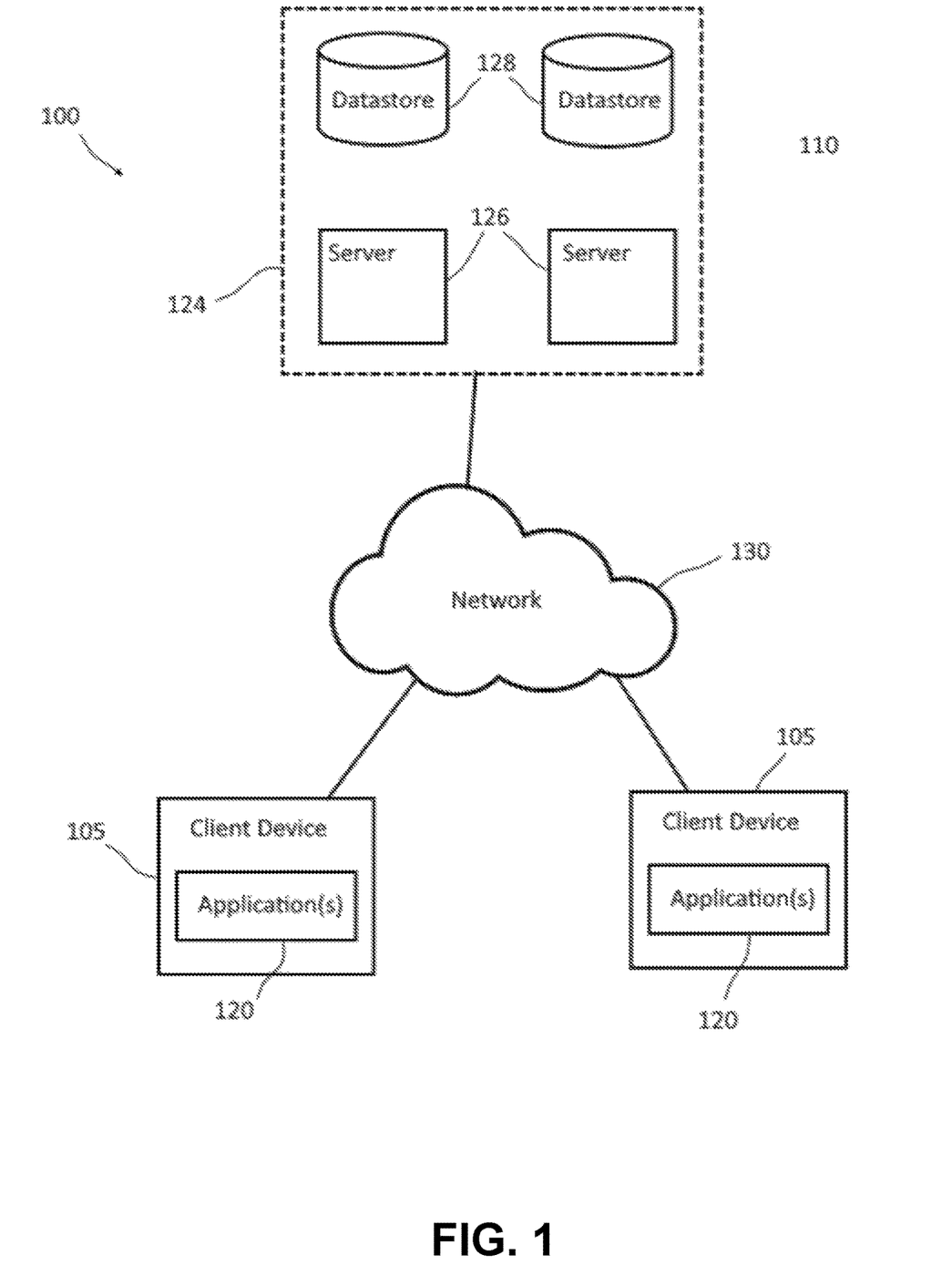
FIG. 1 shows an example system upon which aspects of this disclosure may be implemented.

FIG. 1 is a diagram showing an example computing environment 100 in which the techniques for workflow authoring and execution according to the present disclosure may be implemented. The computing environment 100 includes a cloud-based service 110, client devices 105, and a network 130. The cloud-based service 110 is configured to implement a large-scale data processing system 124 that enables the processing of large-scale datasets, such as geospatial datasets, and the like. To this end, the cloud-based service 110 may include numerous servers 126, datastores 128 and other components (not shown) for implementing the large-scale data processing system 124. The servers 126 may be configured to provide computational resources for the large-scale data processing system 124, and the datastores 128 may be configured to provide storage resources for the large-scale data processing system 124. In the embodiment of FIG. 1, the cloud-based service 110 includes two servers 126 and two datastores although any suitable number of servers and datastores may be utilized.

The client devices 105 enable users to access the large-scale data processing system 124 provided by the cloud-based service 110. The client devices 105 may be any type of computing device, such as a desktop computer, laptop computer, mobile phone, tablet, or other type of computing device. Client devices 105 may include client applications 120 for communicating with the cloud-based service 110 and accessing the large-scale data processing system 124. Cloud-based service 110 and client devices 105 are communicatively coupled by network 130. Network 130 may include one or more wired/wireless communication links and/or communication networks, such as a PAN (personal area network), a LAN (local area network), a WAN (wide area network), or a combination of networks, such as the Internet.

Figure 2:
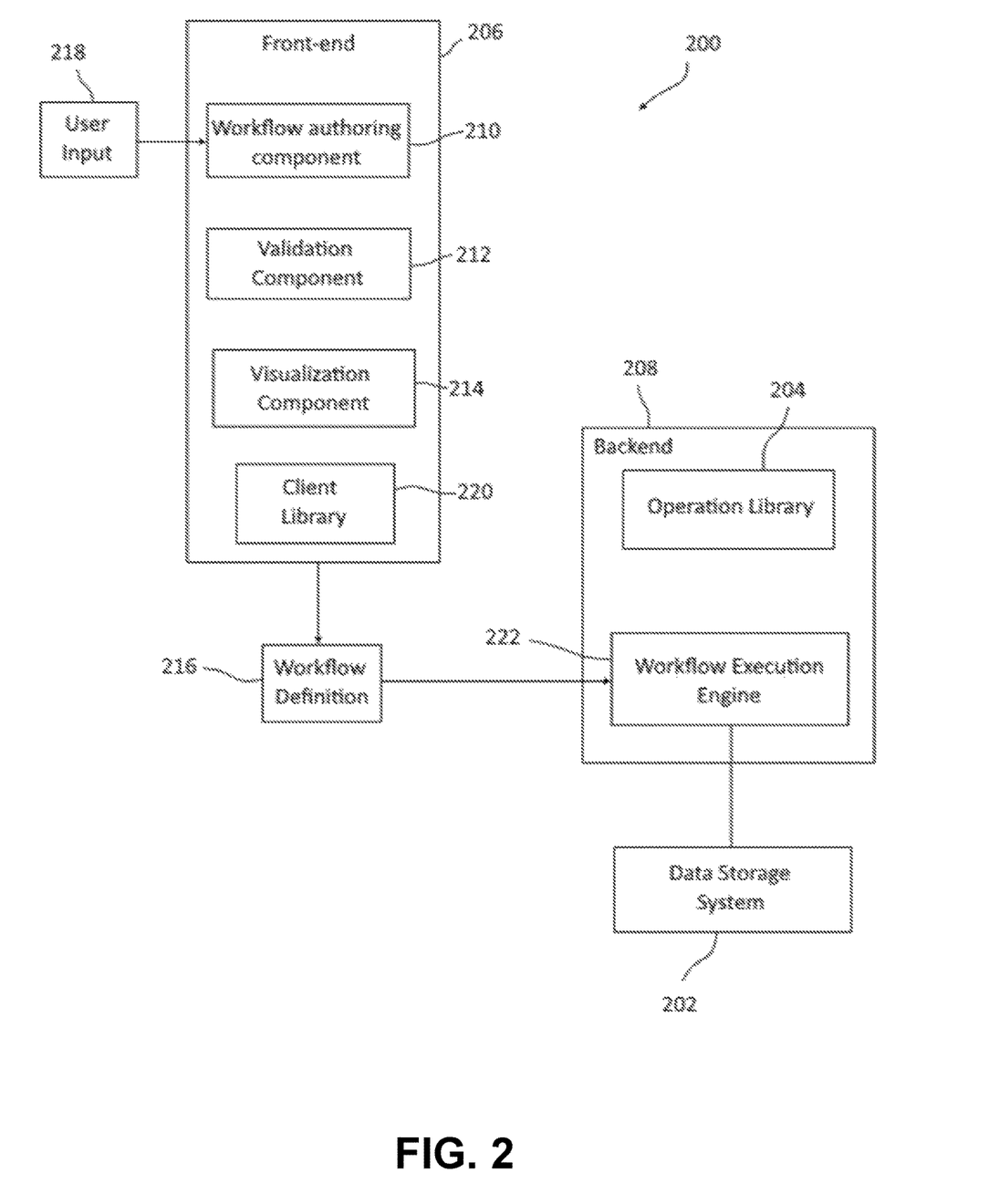
FIG. 2 shows an implementation of a workflow authoring and execution system for the large-scale data processing system of FIG. 1.

Referring now to FIG. 2, the large-scale data processing system 124 includes a modular workflow authoring and execution system 200 that enables the authoring, scheduling, execution and monitoring of data workflows that natively support the processing of large-scale datasets. The large-scale dataset may include geospatial data, archived documents, documents, websites, media files (images, videos, audio files), data storage systems (repositories, databases, file systems), business applications, public and governmental data sources, social media activity, machine log data, and sensor data (from media devices, internet-of-things devices, appliances, farm equipment, vehicle sensors). Workflows may be implemented for processing data in a large-scale dataset for various reasons. For example, workflows may be implemented for analytics purposes to, for example, discover trends, patterns, relationships, and/or other attributes related to the data, which in turn may be used to gain insights and/or guide decisions and/or actions related to the data.

The workflow authoring and execution system 200 enables users to author workflows using predefined operations. The workflow authoring and execution system 200 includes a data storage system 202, an operation library 204, a front-end 206, and a backend 208. The data storage system 202 is configured to store at least one large-scale dataset, such as a geospatial dataset or any other kind of large-scale dataset. In embodiments, a storage application programming interface (API) may be provided that defines the functions and procedures for storing data in and retrieving the data storage system. A predefined metadata schema is defined for the dataset. The API may include functions and procedures for storing and retrieving data formatted according to the predefined metadata schema.

The operation library 204 includes a plurality of predefined operations which may be selected to implement a workflow for processing data from the data storage system. Each predefined operation is implemented as source code, e.g., programmed instructions, which defines functions for implementing the operation. The functions include receiving input metadata formatted according to the predefined metadata schema and identifying input data to be retrieved from the data storage system based on the input metadata. In embodiments, the input metadata may identify one or more locations in the data storage system where input data is located. The functions may include retrieving the identified input data from the data storage system, performing an atomic operation on the retrieved input data to generate output data, and outputting/storing the output data in the data storage system. The functions may also include generating output metadata formatted according to the predefined metadata schema and outputting the output data. In embodiments, the output metadata may identify one or more locations where the output data for an operation is stored in the data storage system.

The front-end 206 is configured to provide end-users with a no-code environment to select and configure workflows for processing data from the dataset and visualize results. The front-end 206 may be implemented by one or more client applications on a client device, such as client device. The front-end may also be implemented as a web-based application on a server which is accessible via an application, such as a browser, on a client device. The front-end 206 includes a workflow authoring component 210, a validation component 212, a visualization component 214, and a client library 202. The workflow authoring component is configured to receive user input for generating a workflow definition 216 that defines a workflow to be performed on data from the data storage system 202. The workflow authoring component 210 may include a user interface that may be presented on the display of a computing device that enables a user to provide user input 218 for generating the workflow definition 216. The user interface may be configured to generate a workflow definition 216 based on user input 218 in any suitable manner. For example, a user interface may include user interface controls that enable a user to select the predefined operations to utilize in the workflow and to identify a sequence for performing the operations. In embodiments, the user interface may be configured to implement a graphical system, e.g., drag-and-drop, for selecting and arranging operations for the workflow.

Figure 3:
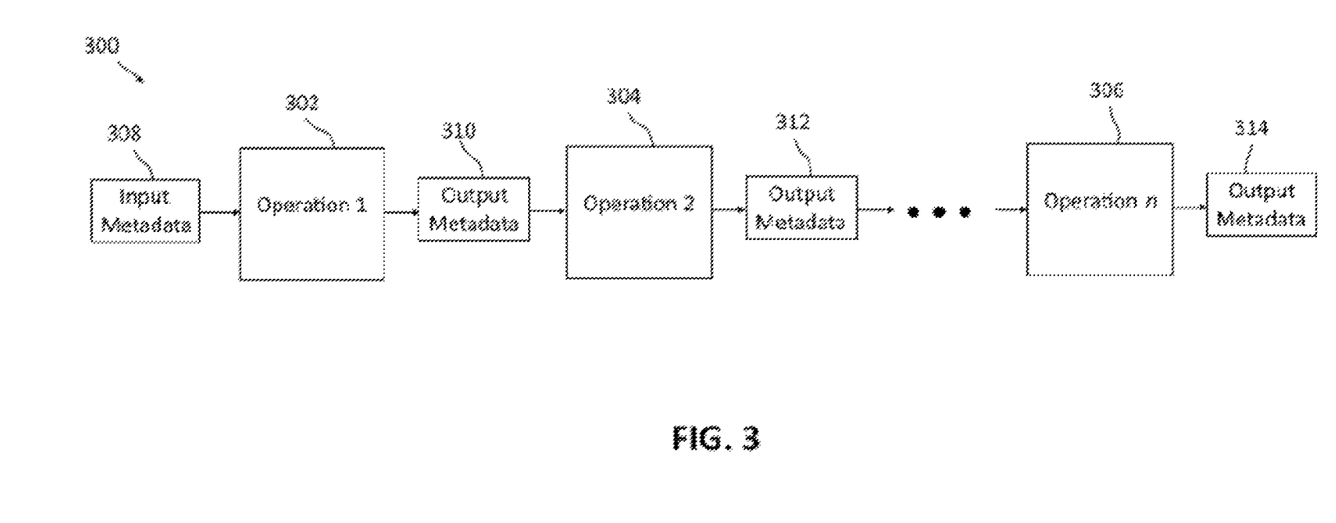
FIG. 3 shows an example of a workflow definition which may be defined by the workflow authoring and execution system of FIG. 2.

An example of a workflow definition 300 which may be authored using the system 200 is depicted in FIG. 3. The workflow definition 300 includes a plurality of operations 302, 304, 306 which are arranged in a sequence to be executed. Each operation 302, 304, 306 is associated with source code that defines an atomic operation to be performed on data from the dataset. Examples of operations include selecting data based on one or more parameters (e.g., location, date, attribute, etc.), transforming the data into one or more derived data sets, computing an index on top of data, computing an average of data, outputting derived data for visualization, and the like. A workflow may be authored by selecting multiple operations to be performed. In embodiments, workflow authoring may include defining the precedence between operations. The system may be configured to determine a sequence of operations for the workflow based on the operations selected as well as the precedence of operations. The sequence may be determined based on, for example, the input and output data types for the selected operations. In embodiments, the sequence may include parallel operations. For example, if one operation (e.g., op1) outputs a sequence of images and the next operation (e.g., op2) receives a single image as input, the workflow can be defined such that several copies op2 are ran to process each image output by op1 in parallel.

In the embodiment of FIG. 3, the workflow 300 is a simple serial operation including a first operation 302, a second operation 304, and an nth operation, or last operation, 306. In embodiments, a workflow may include any number of operations and may include serial as well as parallel operations.

To facilitate the authoring of workflows using predefined operations, the system 200 utilizes a predefined metadata schema for the dataset that specifies, for example, the data types and attributes implemented in the dataset, the vocabulary/terminology utilized to refer to the data types and attributes, data structures for communicating information pertaining to the dataset, and the like. As an example, in the case of geospatial datasets, the metadata schema specified for the dataset may comprise a SpatioTemporal Asset Catalogs (STAC) schema. The predefined metadata schema enables the inputs and outputs for each operation as well as the format of the inputs and outputs to be defined beforehand which in turn enables the code for implementing the functionality of the operations to be prewritten for the system. By predefining the inputs and outputs of the operations, the data handling functionality of the system, such as persisting/caching data between operations, downloading data, and uploading data, may be handled by the system without requiring the user to write specialized code for data handling.

The predefined metadata schema may define formats for input metadata and output metadata for operations. Input metadata includes metadata describing the input data for the operation and defining parameters for selecting the input data to be processed by the operation. Parameters may include values and/or ranges of values for one or more attributes, such as location, dates, sizes, and the like, which may be used to identify/select input data for the operation. The input metadata and the output metadata may also include metadata for defining one or more locations in the data storage system where the data is located or stored. This enables workflows to be processed by passing the output metadata from one operation as the input metadata for the next operation of the workflow to be executed. The data for the next operation is left in the data storage system thereby efficiently and effectively persisting/caching the data between operations. As noted above, embodiments in which the dataset includes geospatial data may utilize a STAC schema to describe the data and define the formats for passing data between operations. The STAC schema, for example, defines a data structure, referred to as a STAC json, which may be utilized as the input metadata and output metadata for the operations. Existing schemas may also be expanded by adding fields, data descriptors, and the like not originally included in the schema. For example, the STAC schema may be expanded by including platform-specific type information not included in the STAC schema.

In the embodiment of FIG. 3, the first operation 302 is configured to receive input metadata 308 which describes the input data for the first operation 302 as well as the location of the input data in the data storage device. The first operation 302 is configured to generate output metadata 310 which includes metadata describing the output data to be output by the operation 302 and may include location information identifying the location at which the output data is stored in the data storage device. The output metadata 310 is provided as input metadata to the next operation, i.e., operation 304. Operation 304 generates output metadata 312. The last operation 306 is configured to receive the output metadata from a previous operation (not shown) as input metadata and to generate output metadata 314. In the embodiment of FIG. 3, the output metadata 314 corresponds to the result data for the workflow 300. In embodiments, a workflow may be composed of multiple workflows such that the output of one workflow is provided as an input to a subsequent workflow. Similarly, workflows may be arranged as step in another workflow. For example, the output of an operation may be provided as an input to a workflow and the output of the workflow may then be provided as an input to a next operation. A user may combine and configure several operations and workflows in many ways to define more complex workflows.

The validation component 212 is configured to perform a validation check of the workflow definition 216 and its configuration. For example, the validation component 212 may be configured to verify that the outputs of the operations are compatible with the inputs of subsequent operations. The validation component 212 may also be configured to determine that all required parameters of the operations have been set. For example, some operations may require user input to define parameters of the input data, output data, and/or the atomic operation. If an operation requires user input to define the parameters, the validation component 212 may be configured to generate an alert or notification via the user interface requesting input of the required parameters. If the validation component determines that the configuration of the workflow is correct and that all input parameters, if needed, have been set, the validation component is configured to validate the workflow for execution.

Once a workflow has been executed and result data for the workflow has been determined, the visualization component 214 is configured to receive the result data and generate a visualization of the result data on a display screen of the client device. The visualization may include one or more images, graphs, tables, graphics, and the like that depicts the result data in a meaningful way to the user. In embodiments, the front-end receives the output metadata, such as the output metadata 314 of FIG. 3, from the last operation 306. The output metadata includes information identifying the location of the result data in the data storage system. The front-end may then retrieve the result data from the data storage system and provide it to the visualization component 214.

The front-end 206 includes a client library 220 that defines the functions for implementing the functionality of the workflow authoring component 210, validation component 212, and visualization component 214. For example, the client library 220 includes functions for generating workflow definitions based on user input, validating the user inputs and workflow definitions, triggering the execution of workflows in the backend, and formatting the result data for visualization by the user.

The backend 208 includes a workflow execution engine 222 for controlling the execution of workflows in the system. The backend 208 may be implemented on a server, such as one of servers, and may be connected to the front-end via a network, such as network. The workflow execution engine 222 is configured to receive workflow definition 216 from the front-end 206 and control/orchestrate the execution of the operations of the workflow. The workflow execution engine 222 is configured to interface with the code implementing the operations of the workflow. For example, the workflow execution engine 222 may be configured to retrieve the input data identified by the input metadata for each operation of the workflow, to retrieve the identified input data from the data storage system 202, and to provide the input data to the operations for processing. Similarly, the workflow execution engine 22 may be configured to receive the output data from the operations, to store the output data in the data storage system 202, and to provide the storage location for the output data 410 for inclusion in the output metadata for the operation. The workflow execution engine 222 may also be configured to provide the output metadata from each operation as input to the next operation in the workflow, and to provide the output metadata from the last operation in the workflow to the front-end 206 for display to the user.

Figure 4:
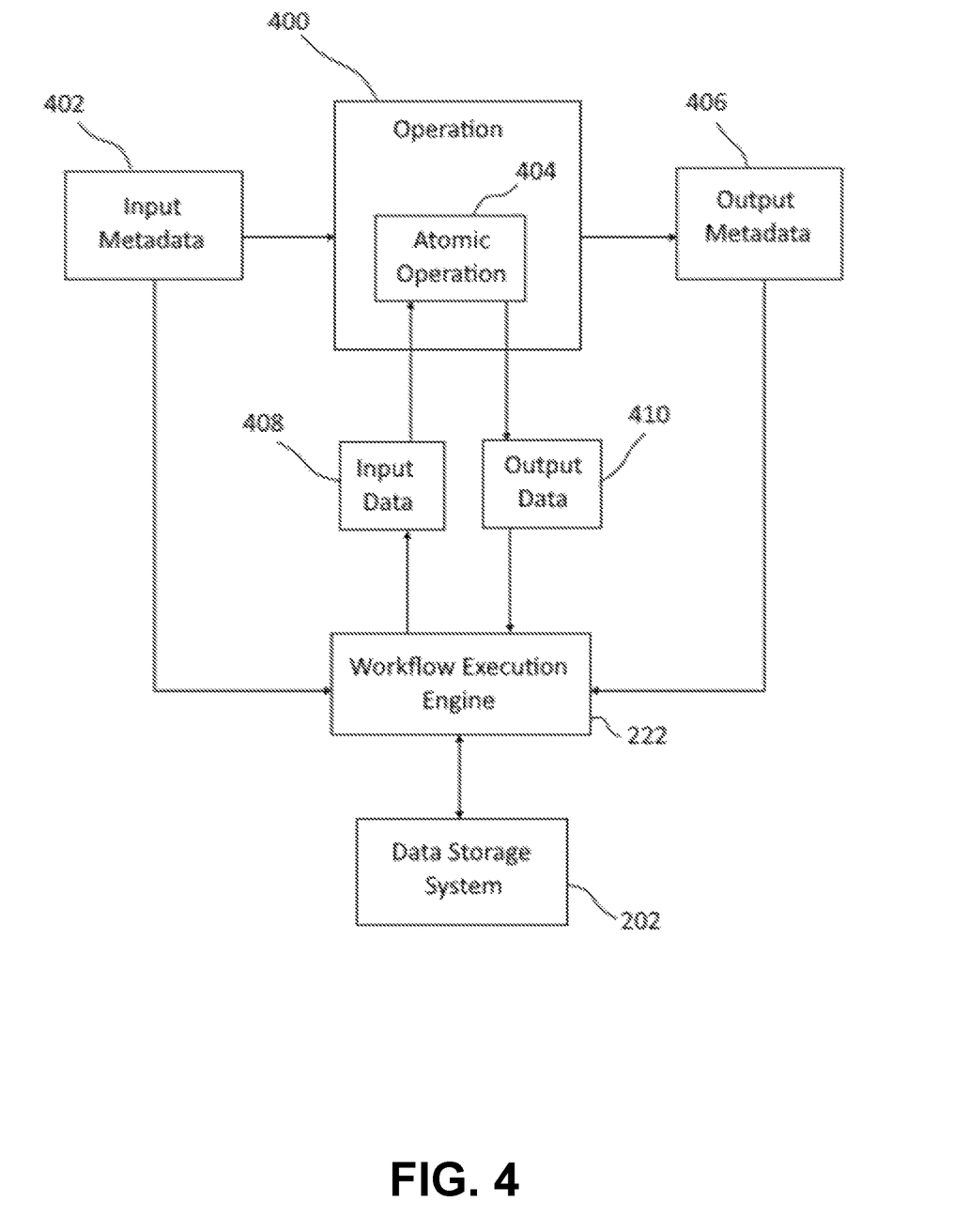
FIG. 4 depicts the interaction between an operation of a workflow and the workflow execution engine during execution of the operation.

FIG. 4 illustrates the interaction between an operation 400 of a workflow and the workflow execution engine 222. The operation 400 is configured to receive input metadata 402 which describes the input data 408 for the operation 400 and identifies the location of the input data 408 in the data storage system 202. The workflow execution engine is configured to read the input metadata 402 to identify the location of the input data 408 in storage, to retrieve the input data 408 and provide the input data 408 to the operation 400 for processing based on the predefined atomic operation 404. The result of the atomic operation is provided as output data 410 to the workflow execution engine which is configured to store the output data 410 in the data storage system 202. The location of the output data 410 in storage may then be included in the output metadata 406 is generated by the operation 400.

Figure 5:
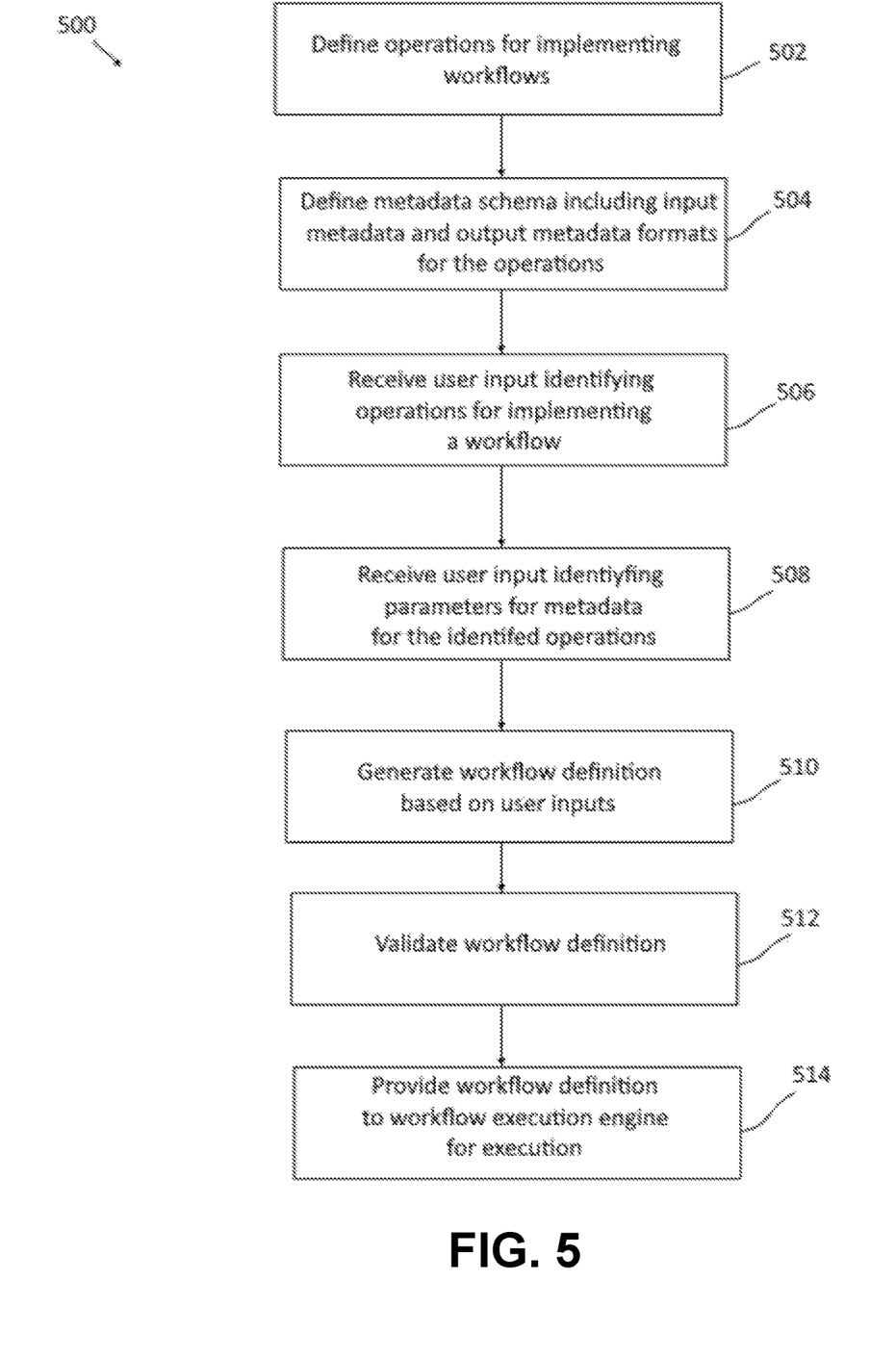
FIG. 5 is a flowchart of a method of authoring a workflow in accordance with this disclosure.

FIG. 5 shows an example method 400 of authoring a workflow for processing large-scale dataset in accordance with this disclosure. The method begins with defining a plurality of operations for implementing a workflow for processing data in the dataset (block 502). A metadata schema for the dataset including formats for input metadata and output metadata for the predefined operations is also defined (block 504). User input is then received that identifies operations to be used to generate a workflow definition which specifies a workflow for processing data from the dataset (block 506). User input defining parameters for the input metadata and/or output metadata for the identified operations is also received (block 508). The workflow definition is generated based on the user inputs (block 510). The workflow definition is then validated by checking the configuration of the workflow and verifying all required parameters have been set (block 512). The workflow definition is then provided to a workflow execution engine for execution (block 514).

Figure 6:
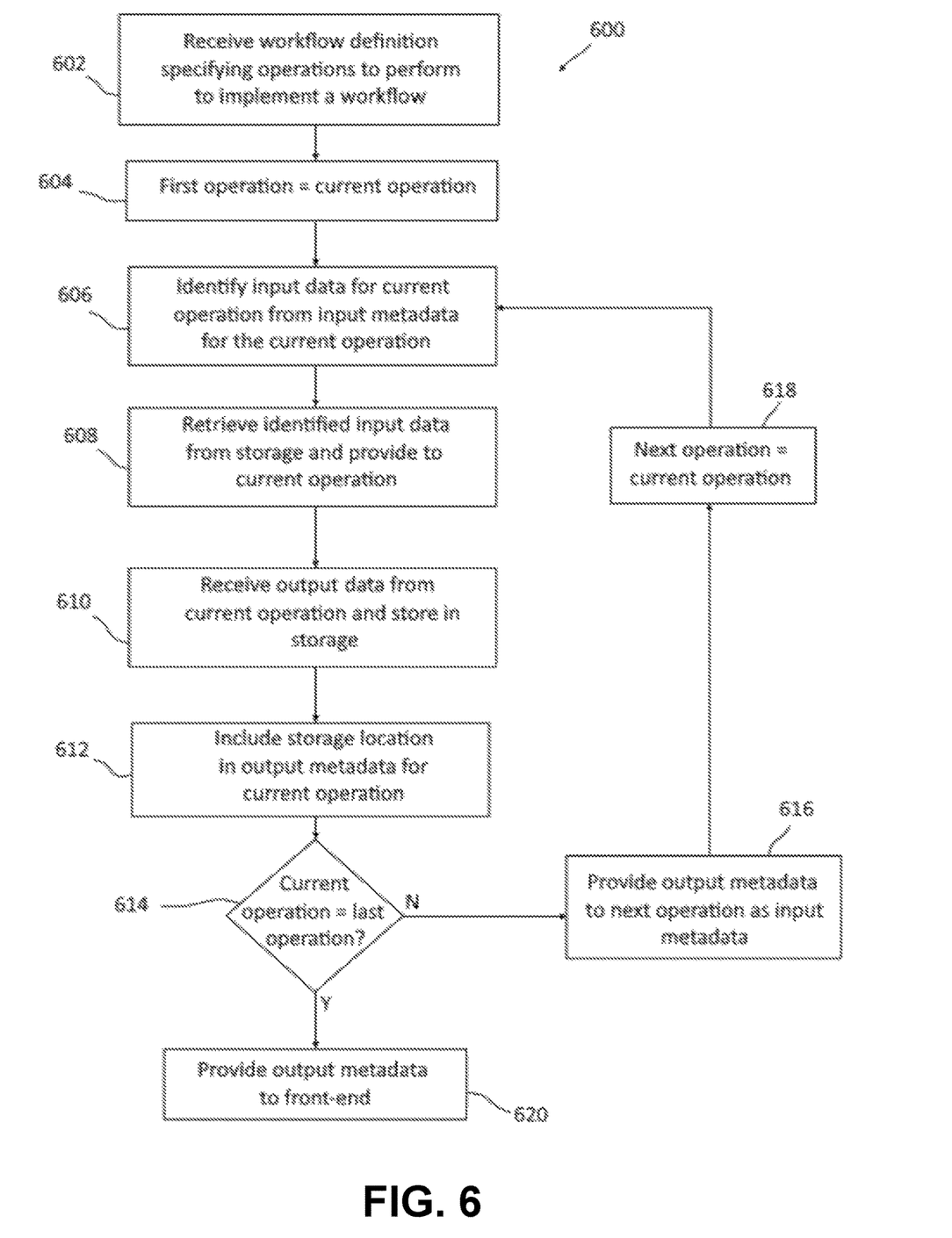
FIG. 6 is a flowchart of a method for executing a workflow in accordance with this disclosure.

An example method 600 for executing a workflow in accordance with this disclosure will now be described with reference to FIG. 6. The method begins with receiving a workflow definition that specifies a plurality of operations to be performed in sequence to implement a workflow (block 602). A first operation of the workflow definition is made the current operation (604) and is executed by identifying the input data for the current operation from the input metadata for the first operation (block 606) and retrieving the input data from storage and providing the input data to the current operation for processing (block 608). The output data for the current operation is then stored in storage (block 610) and the storage location for the output data is included in the output metadata for the current operation (block 612). A determination is then made as to whether the current operation is the last operation in the workflow definition (block 614). If the current operation is not the last operation, the output metadata for the current operation is provided as input metadata to the next operation in the workflow (block 616). The next operation is then made the current operation (block 618) and the current operation is the executed by returning to block 606. If the current operation is the last operation of the workflow, the output metadata is provided to the front-end for processing by the front-end (block 620), e.g., by accessing the output data and displaying the output data to a user. The system may be configured to enable the user to define the output of an intermediate operation of the workflow to use as an output provided to the front-end for visualization. In embodiments, the outputs of multiple operations may be selected for visualization at the front-end.

Figure 7:
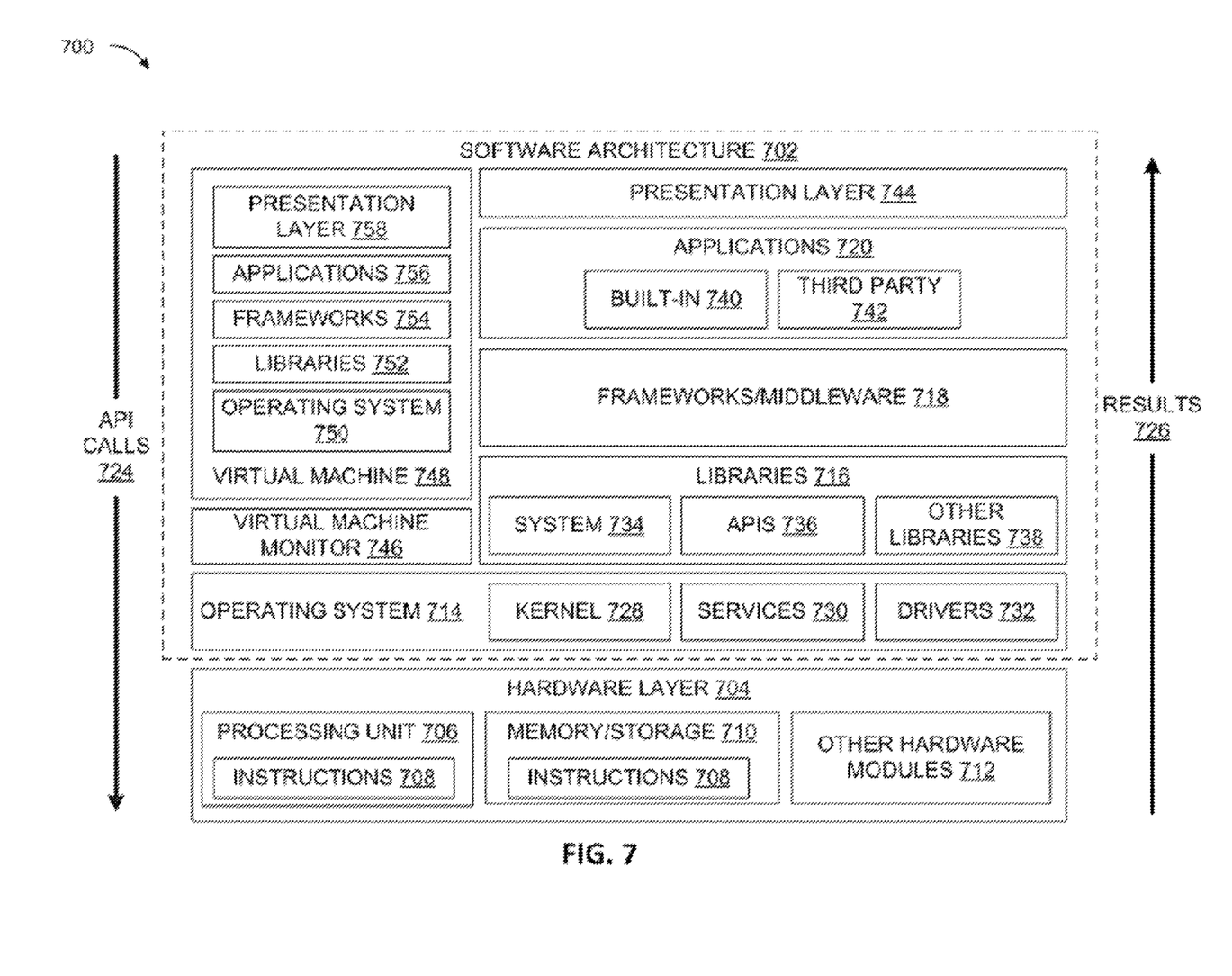
FIG. 7 is a block diagram illustrating an example software architecture, various portions of which may be used in conjunction with various hardware architectures herein described.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than interacting directly with the OS 714. The libraries 716 may include system libraries 734 (for example, C standard library) that may provide functions such as memory allocation, string manipulation, file operations. In addition, the libraries 716 may include API libraries 1436 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the framework 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/ modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
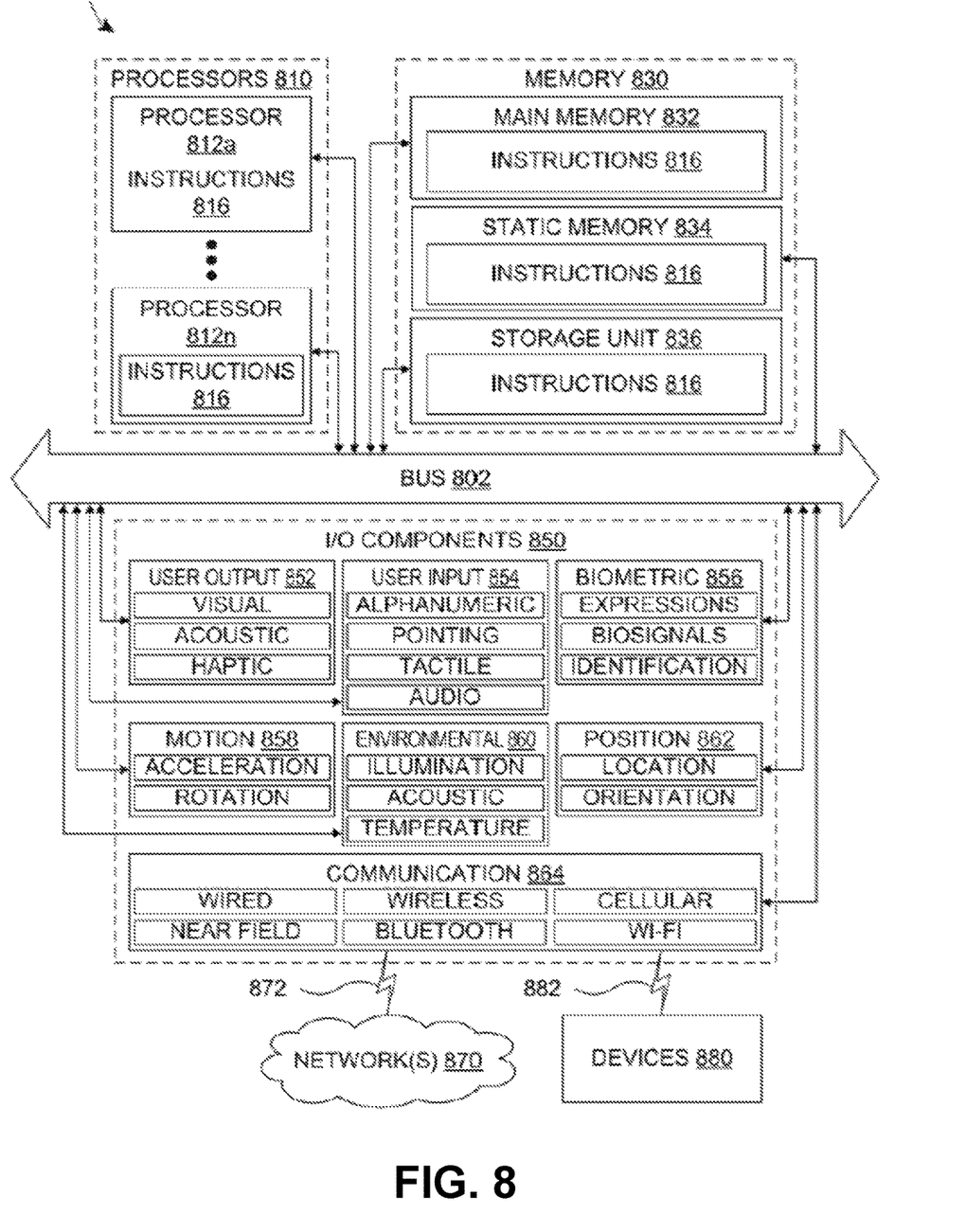
FIG. 8 is a block diagram illustrating components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in the form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

In the following, further features, characteristics and advantages of the invention will be described by means of items:

Item 1. A data processing system comprising:
　at least one processor; and
　a machine-readable medium storing executable instructions that, when executed, cause the processor to perform operations comprising:
　　receiving a workflow definition at a backend of a workflow authoring and execution system, the workflow definition defining a plurality of operations to be performed on data from a large-scale dataset stored in a data storage system, wherein each of the operations includes:
　　　input metadata that describes input data to be processed by the respective operations and identifies a location of the input data in the data storage system;
　　　programmed instructions for performing an atomic operation on the input data to generate output data; and
　　　output metadata that describes the output data and identifies a location of the output data in the data storage system;
　　executing each of the operations by:
　　　retrieving the input data for each of the respective operations from the location of the input data identified by the input metadata as each of the respective operations is executed;
　　　storing the output data for each of the respective operations at the location of the output data identified by the output metadata as each of the respective operations is executed;
　　　providing the output metadata from each of the respective operations as the input metadata to a next operation after each of the respective operations is executed until a last operation is reached;
　　　when the last operation is executed, providing the output metadata to a front-end of the workflow authoring and execution system.

Item 2. The data processing system of item 1, further comprising:
　retrieving the output data for the last operation from the location identified by the output metadata for the last operation; and
　displaying the output data on a display device.

Item 3. The data processing system of any of items 1 and 2, wherein the input metadata and the output metadata for each of the operations is formatted according to a predefined metadata schema defined for the large-scale dataset.

Item 4. The data processing system of any of items 1-3, wherein each of the operations is selected from a library of predefined operations for use in authoring workflows for processing data in the large-scale dataset.

Item 5. The data processing system of any of items 1-4, wherein the output data of each of the operations is stored at a respective storage location in the data storage system, and
　wherein the respective storage location of the output data of each of the respective operations is included as the location for the output metadata in the output metadata for the operation.

Item 6. The data processing system of any of items 1-5, further comprising:
　validating the workflow definition before the workflow definition is received by the backend of the workflow authoring and execution system.

Item 7. The data processing system of any of items 1-7, wherein the backend of the workflow authoring and execution system is implemented on a server of a cloud-based service, and
　wherein the workflow definition is received from a client device.

Item 8. A method of executing a workflow for processing data from a large-scale dataset stored in a data storage system, the method comprising:
　receiving a workflow definition at a backend of a workflow authoring and execution system, the workflow definition defining a plurality of operations to be performed on the data from the large-scale dataset, wherein each of the operations includes:

input metadata that describes input data to be processed by the respective operation and identifies a location of the input data in the data storage system;
programmed instructions for performing an atomic operation on the input data to generate output data; and
output metadata that describes the output data and identifies a location of the output data in the data storage system;
executing each of the operations by:
retrieving the input data for each of the respective operations from the location of the input data identified by the input metadata as each of the respective operations is executed;
storing the output data for each of the respective operations at the location of the output data identified by the output metadata as each of the respective operations is executed;
providing the output metadata from each of the respective operations as the input metadata to a next operation after each of the respective operations is executed until a last operation is reached;
when the last operation is executed, providing the output metadata to a front-end of the workflow authoring and execution system.

Item 9. The method of item 8, further comprising:
retrieving the output data for the last operation from the location identified by the output metadata for the last operation; and
displaying the output data on a display device.

Item 10. The method of any of items 8-9, wherein the input metadata and the output metadata for each of the operations is formatted according to a predefined metadata schema defined for the large-scale dataset.

Item 11. The method of any of items 8-10, wherein each of the operations is selected from a library of predefined operations for use in authoring workflows for processing data in the large-scale dataset.

Item 12. The method of any of items 8-11, wherein the output data of each of the operations is stored at a respective storage location in the data storage system, and
wherein the respective storage location of the output data of each of the respective operations is included as the location for the output metadata in the output metadata for the operation.

Item 13. The method of any of items 8-12, further comprising:
validating the workflow definition before the workflow definition is received by the backend of the workflow authoring and execution system.

Item 14. The method of any of items 8-13, wherein the backend of the workflow authoring and execution system is implemented on a server of a cloud-based service, and
wherein the workflow definition is received from a client device.

Item 15. A method of authoring a workflow for processing data from a large-scale dataset stored in a data storage system, the method comprising:
defining a metadata schema for the large-scale dataset;
receiving user input at a front-end of a workflow authoring and execution system, the user input defining a workflow definition, the workflow definition including a plurality of operations to be performed, wherein each of the operations includes:
input metadata formatted according to the metadata schema, the input metadata describing input data to be processed by the operation and identifying a location for the input data in the data storage system;
programmed instructions for performing an atomic operation on the input data to generate output data; and
output metadata formatted according to the metadata schema, the output metadata describing the output data and identifying a location for the output data in the data storage system;
receiving user input defining input parameters for the operations;
validating a configuration of the workflow definition and the input parameters; and
sending the workflow definition to a backend of the workflow authoring and execution system in response to the validation.

Item 16. The method of item 15, wherein each of the operations is selected from a library of predefined operations for use in authoring workflows for processing data in the large-scale dataset.

Item 17. The method of any of items 15-16, wherein the backend of the workflow authoring and execution system is implemented on a server of a cloud-based service, and
wherein the workflow definition is received from a client device.

Item 18. The method of any of items 15-18, further comprising:
receiving the output metadata for a last operation;
retrieving the output data for the last operation from the location identified in the output metadata for the last operation; and
displaying the output data on a display screen.

Item 19. The method of any of items 15-19, wherein the output metadata for each of the operations except for a last operation is provided to a next operation as the input metadata for the operation.

Item 20. The method of any of items 15-19, wherein the large-scale dataset is a geospatial dataset, and
wherein the metadata schema for the dataset is a SpatioTemporal Asset Catalogs (STAC) schema.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system for processing large-scale datasets, the data processing system comprising:
   at least one processor; and
   a machine-readable medium storing executable instructions that, when executed, cause the processor to perform operations comprising:
   receiving user input defining a workflow definition at a front-end of a workflow authoring and execution system, the workflow definition defining a plurality of operations to be performed on data from a large-scale dataset stored in a data storage system as a workflow, wherein each of the operations includes:
      input metadata for each of the operations formatted according to a predefined metadata schema, the input metadata including first input metadata for a first operation of the workflow, the first input metadata identifying a location of input data in the data storage system for the first operation of the workflow;
      programmed instructions for performing an atomic operation on the input data to generate output data; and
      output metadata formatted according to the metadata schema, the output metadata describing the output data and identifying a location of the output data in the data storage system; and
   validating a configuration of the workflow definition;
   sending the workflow definition to a backend of the workflow authoring and execution system in response to the validation; and
   executing the workflow with the backend of the workflow authoring and execution system by:
      retrieving the input data for each of the respective operations from the location of the input data identified by the input metadata as each of the respective operations is executed;
      determining a storage location for storing the output data for each of the respective operations in the data storage system as each of the respective operations is executed;
      adding the determined storage location used to store the output data for each of the respective operations in the data storage system to the output metadata for each of the respective operations as the workflow is being executed;
      using the output metadata from each of the respective operations as the input metadata for a next operation after each of the respective operations is executed until a last operation is reached; and
      when the last operation is executed, providing the output metadata to the front-end of the workflow authoring and execution system.

2. The data processing system of claim 1, further comprising:
   retrieving the output data for the last operation from the location identified by the output metadata for the last operation; and
   displaying the output data on a display device.

3. The data processing system of claim 1, wherein each of the operations is selected from a library of predefined operations for use in authoring workflows for processing the data in the large-scale dataset.

4. The data processing system of claim 1, further comprising:
   validating the workflow definition before the workflow definition is received by the backend of the workflow authoring and execution system.

5. The data processing system of claim 1, wherein the backend of the workflow authoring and execution system is implemented on a server of a cloud-based service, and
wherein the workflow definition is received from a client device.

6. A method of executing a workflow for processing data from a large-scale dataset stored in a data storage system, the method comprising:
receiving user input defining a workflow definition at a front-end of a workflow authoring and execution system, the workflow definition defining a plurality of operations to be performed on the data from the large-scale dataset as the workflow, wherein each of the operations includes:
input metadata for each of the operations formatted according to a predefined metadata schema, the input metadata, the input metadata including first input metadata for a first operation of the workflow, the first input metadata identifying a location of input data in the data storage system for the first operation of the workflow;
programmed instructions for performing an atomic operation on the input data to generate output data; and
output metadata formatted according to the metadata schema, the output metadata describing the output data and identifying a location of the output data in the data storage system; and
validating a configuration of the workflow definition;
sending the workflow definition to a backend of the workflow authoring and execution system in response to the validation; and
executing the workflow with the backend of the workflow authoring and execution system by:
retrieving the input data for each of the respective operations from the location of the input data identified by the input metadata as each of the respective operations is executed;
determining a storage location for storing the output data for each of the respective operations in the data storage system as each of the respective operations is executed;
adding the determined storage location used to store the output data for each of the respective operations in the data storage system to the output metadata for each of the respective operations as the workflow is being executed;
using the output metadata from each of the respective operations as the input metadata for a next operation after each of the respective operations is executed until a last operation is reached; and
when the last operation is executed, providing the output metadata to the front-end of the workflow authoring and execution system.

7. The method of claim 6, further comprising:
retrieving the output data for the last operation from the location identified by the output metadata for the last operation; and
displaying the output data on a display device.

8. The method of claim 6, wherein each of the operations is selected from a library of predefined operations for use in authoring workflows for processing the data in the large-scale dataset.

9. The method of claim 6, further comprising:
validating the workflow definition before the workflow definition is received by the backend of the workflow authoring and execution system.

10. The method of claim 6, wherein the backend of the workflow authoring and execution system is implemented on a server of a cloud-based service, and
wherein the workflow definition is received from a client device.

11. A method of authoring a workflow for processing data from a large-scale dataset stored in a data storage system, the method comprising:
defining a metadata schema for the large-scale dataset;
receiving user input at a front-end of a workflow authoring and execution system, the user input defining a workflow definition, the workflow definition including a plurality of operations to be performed as a workflow, wherein each of the operations includes:
input metadata formatted according to the metadata schema, the input metadata describing input data to be processed by the operation and identifying a location for the input data in the data storage system;
programmed instructions for performing an atomic operation on the input data to generate output data; and
output metadata formatted according to the metadata schema, the output metadata describing the output data and identifying a location for the output data in the data storage system;
receiving user input defining input parameters for the operations;
validating a configuration of the workflow definition and the input parameters; and
sending the workflow definition to a backend of the workflow authoring and execution system in response to the validation,
wherein:
the input metadata for a first operation is defined by the user input,
the backend of the workflow authoring and execution system determines a storage location for the output data of each operation as the workflow is being executed,
the determined storage location of the output data for each operation is added to the output metadata of the operation as the workflow is being executed, and
the output metadata of each operation is used as the input metadata for a subsequent operation.

12. The method of claim 11, wherein each of the operations is selected from a library of predefined operations for use in authoring workflows for processing the data in the large-scale dataset.

13. The method of claim 11, wherein the backend of the workflow authoring and execution system is implemented on a server of a cloud-based service, and
wherein the workflow definition is received from a client device.

14. The method of claim 11, wherein the large-scale dataset is a geospatial dataset, and
wherein the metadata schema for the dataset is a SpatioTemporal Asset Catalogs (STAC) schema.

* * * * *